UNITED STATES PATENT OFFICE.

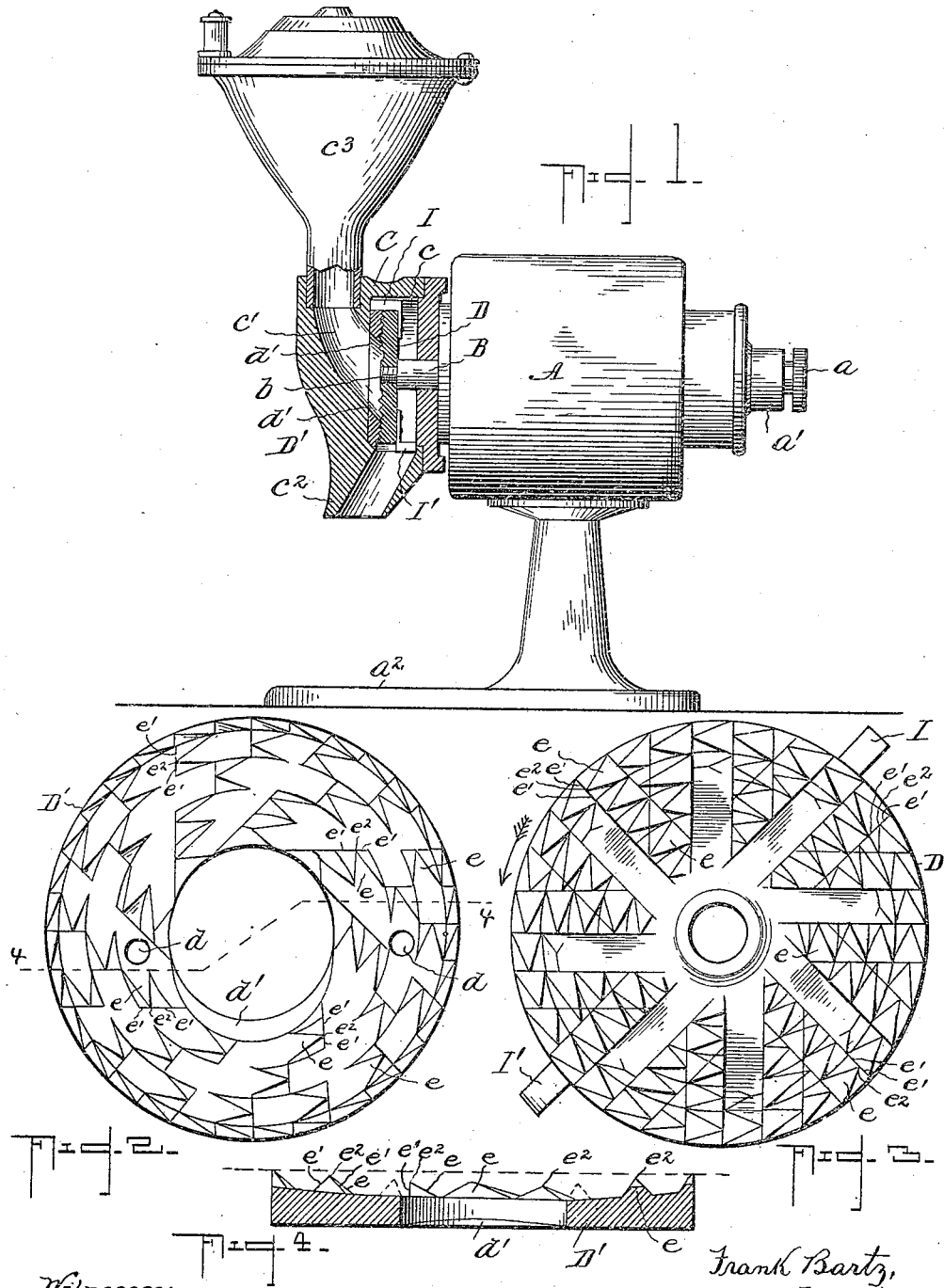

FRANK BARTZ, OF HORNELLSVILLE, NEW YORK, ASSIGNOR, BY MESNE ASSIGNMENTS, TO THE A. J. DEER CO., INCORPORATED, OF HORNELL, NEW YORK.

COFFEE-MILL.

953,251. Specification of Letters Patent. Patented Mar. 29, 1910.

Application filed December 7, 1905. Serial No. 290,727.

*To all whom it may concern:*

Be it known that I, FRANK BARTZ, a citizen of the United States, residing at Hornellsville, in the county of Steuben and State of New York, have invented a Coffee-Mill, of which the following is a specification.

This invention is an improvement in mills, and relates more especially to the class of coffee-mills which are operated by an electric motor.

The primary object of the invention is to provide a coffee-mill in which the disks for grinding or pulverizing the coffee are provided with faces comprising teeth of such shape and arrangement as to cut the bean into small particles instead of grinding them as is usual, said faces of the disk being constructed and arranged with relation to each other whereby the coffee beans are rapidly fed between the disks for the action of the cutting teeth.

A further object of the invention is to provide a coffee mill of this character with means for thoroughly cleaning the ground or pulverized coffee from the mill, such cleaners in the present instance being in the form of projections or blades which are carried by the revoluble disk and act in the nature of fan-blades to force the ground coffee out of the spout and also cool the coffee.

Other though minor objects of the invention will hereinafter appear, and what I claim as novel in the construction and arrangement of parts constituting my improvements will be hereinafter more specifically set forth in the appended claim.

In the accompanying drawings which form a part of this specification:—Figure 1 is a side elevation of a coffee mill constructed in accordance with my invention, parts being in section to show the construction and application of my improvements. Fig. 2 is a detail face view of the stationary cutting disk. Fig. 3 is a similar view of the revoluble cutting disk. Fig. 4 is a sectional view on the line 4—4 of Fig. 2, and including only those teeth adjacent the section line, and immediately beyond the central opening.

Similar letters of reference indicate similar parts in all the figures of the drawing.

In the present instance I have shown my invention applied to a coffee mill which is operated by an electric-motor, as A, which drives the shaft B of the mill, said shaft being adjustable longitudinally, as is usual, by means of the thumb-nut $a$, threaded in the boss $a'$ at one end of the motor-casing.

Adjoining the electric motor A there is a casing C, which provides the grinding chamber $c$, in which the disks are located, a feed opening $c'$, leading to said chamber, and a spout $c^2$ leading therefrom, the latter being disposed above a platform, as $a^2$, forming the base of the supporting frame of the mill. The feed-opening $c'$ is connected with the usual hopper $c^3$.

The driving shaft B is reduced at its end, as at $b$, and threaded, to receive the revoluble cutting disk D, which latter operates in conjunction with a stationary disk D' secured in the grinding-chamber $c$ against one side thereof by means of screws which pass through the holes $d$ in said disk.

The stationary disk D' is provided with a central opening on a line with the feed opening $c'$, the upper and lower edges of the central opening in the disk being beveled, as at $d'$, to facilitate the feed, for which purpose, also, this disk is provided with a slightly concaved face.

The face of each disk D and D' is provided with pyramidal cutting teeth $e$ disposed concentrically and presenting converging cutting edges $e'$ $e'$ joining in a point $e^2$ at the outer end of the tooth. From the point the tooth is beveled rearward, as shown, and said teeth are arranged so that when the disks are brought together face to face the teeth on one will intermesh with those on the other, whereby when the disk D is revolved the cutting edges $e'$ will serve to cut the coffee bean. In this regard it will be noted that the faces of the teeth on one disk are disposed at an angle to the faces of the teeth on the other disk, whereby in operation the teeth will produce a shearing cut as they pass. As will be readily seen this provides for cutting the coffee bean in the easiest possible manner, and as the face of the stationary disk is concaved or dished the beans will be cut into pieces smaller and smaller as they pass to the periphery of the disks.

For the purpose of assisting the feeding of the beans or particles to the outer row of teeth the teeth of the inner rows are spaced apart, as shown. In the case of the revolving disk D the feed spaces in the face of the disk are provided for by depressions or channels $f$, formed by cutting away the inner teeth of certain tangential rows, as shown in Fig. 3. In the case of each disk, however, the outer row of teeth is continuous, so as to reduce the particles all to a uniform size as they pass from between the disks.

It will be readily understood from the foregoing that the coffee beans as they pass into the space between the disks are cut by the teeth, instead of being ground, as usual and therefore it will require considerably less power to operate the disks than is required by the employment of the usual grinders. This permits the employment of an electric motor of very small horse-power, say about one-fourth, and thus the mill of ordinary size can be driven by the usual lighting current. The mill is also much lighter in weight, and can be mounted on a counter.

In connection with the grinding or cutting disks D and D' I employ cleaners, for the purpose of preventing the ground or fine coffee from adhering to the sides of the chamber $c$. I accomplish this in the present instance by attaching to the periphery of the revoluble disk D projections or blades I and I', one of which, as I, extends over the edge of the stationary disk D', while the other blade, as I', projects rearward into the space or chamber in the rear of the grinding or cutting disks. It will be noted that these blades practically scrape the edge of the stationary disk and the inner wall of the grinding-chamber $c$, so as to effectually dislodge any particles of coffee that may adhere thereto. These blades also act as fans, owing to the speed at which they revolve, and in this capacity they act to blow the ground coffee out through the spout. The blades or cleaners in their capacity as fans also act to cool the coffee after it is ground, though the particles of coffee are heated to a very little extent during the operation of grinding or cutting.

Having described my invention I do not wish to be limited in my protection to the precise construction herein shown and described, as changes may be made within the spirit and scope of my claim.

I claim:—

In a coffee mill, a grinding disk having a concave cutting face provided with inclined teeth each having a V-shaped end at right angles to the disk and forming contiguous cutting edges oppositely inclined from the face of the disk, said teeth being arranged in concentric rows and spaced apart irregularly to provide staggered recesses, combined with a grinding disk having a straight face and teeth similar to those of the other disk and having recesses extending tangentially from a small circle at the center portion of the disk to a point at the inner edge of the outer row of teeth, as herein shown and described.

In testimony whereof I have signed my name to this specification in the presence of two subscribing witnesses.

FRANK BARTZ.

Witnesses:
  C. W. ETZ,
  E. C. WIGHTMAN.